(12) United States Patent
Birague

(10) Patent No.: US 7,654,383 B2
(45) Date of Patent: Feb. 2, 2010

(54) TURNAROUND DEVICE FOR A TRANSFER LINE

(75) Inventor: Frédéric Birague, Fargues (FR)

(73) Assignee: Proditec, Pessac (FR)

( * ) Notice: Subject to any disclaimer, the term of this patent is extended or adjusted under 35 U.S.C. 154(b) by 121 days.

(21) Appl. No.: 12/054,398

(22) Filed: Mar. 25, 2008

(65) Prior Publication Data

US 2008/0236994 A1    Oct. 2, 2008

(30) Foreign Application Priority Data

Mar. 26, 2007 (FR) .................................. 07 54033

(51) Int. Cl.
*B65G 15/14* (2006.01)
(52) U.S. Cl. ...................... 198/603; 198/403
(58) Field of Classification Search ................ 198/403, 198/406, 603, 604, 607, 626.1
See application file for complete search history.

(56) References Cited

U.S. PATENT DOCUMENTS

2005/0077150 A1    4/2005   Dickinson et al.

FOREIGN PATENT DOCUMENTS

JP          60-188216       9/1985

*Primary Examiner*—James R Bidwell
(74) *Attorney, Agent, or Firm*—Young & Thompson

(57) ABSTRACT

The object of the invention is a turnaround device (18) for a transfer line of products P, in particular pharmaceutical products, comprising at least one turnaround wheel (20) that uses a guide surface Sint, whereby said wheel (20) is mounted so as to rotate around a so-called turnaround axis (30) and at least two belts clamp the products P that are to be turned around, at least one input belt (22) guided by the surface Sint and moving at a speed Vint and at least one output belt (24) moving at a speed Vext, whereby Vint is different from Vext, characterized in that said turnaround device uses guide means (38) that comprise at least one guide surface Sext at the speed Vext of the output belt (24).

18 Claims, 4 Drawing Sheets

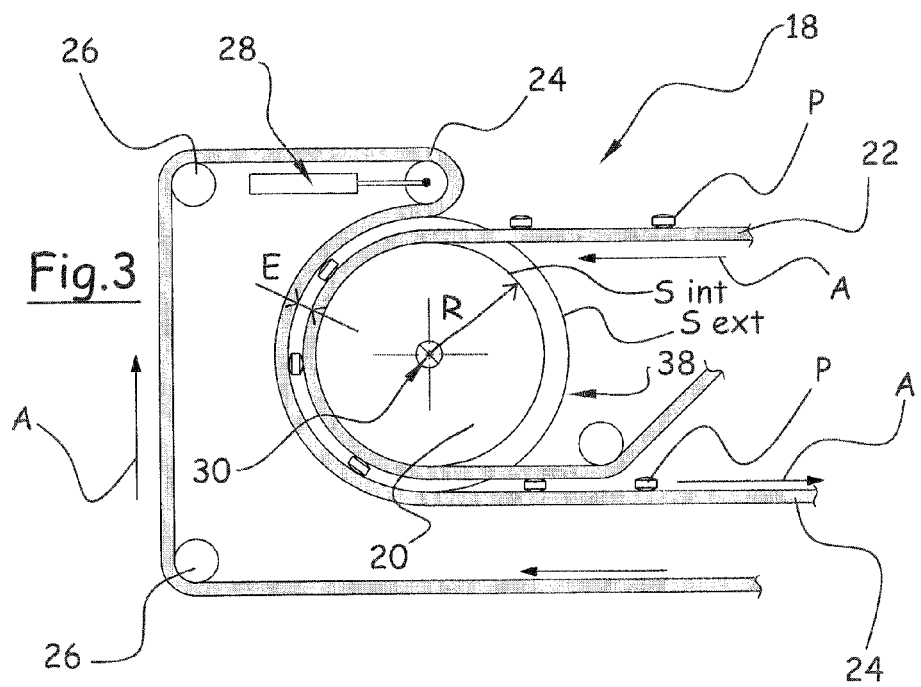
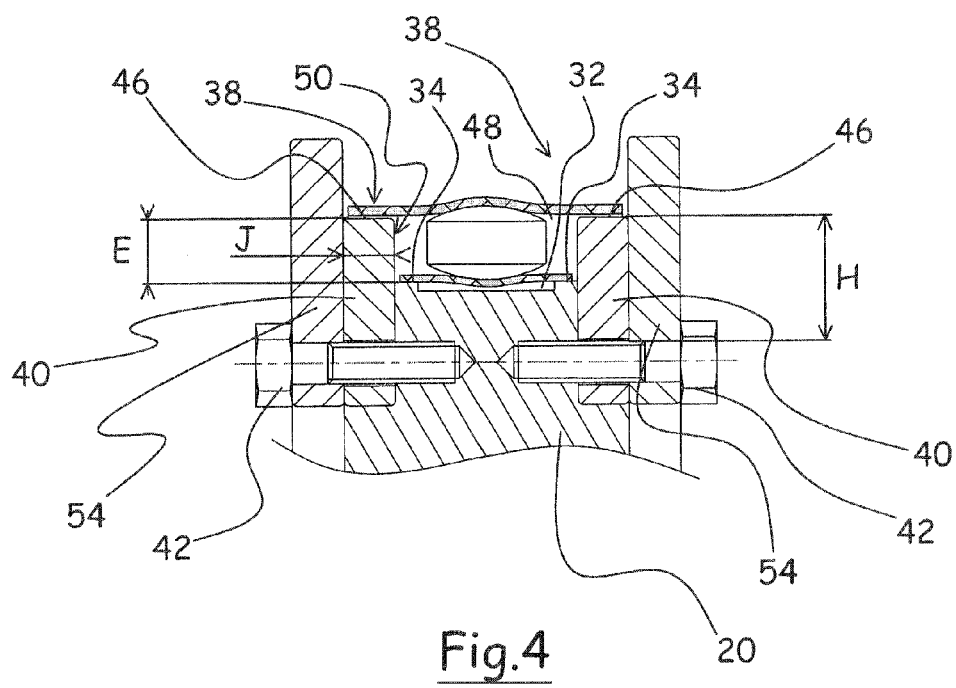

TURNAROUND DEVICE FOR A TRANSFER LINE

This invention relates to a turnaround device that is designed to allow a precise turnaround of products, in particular pharmaceutical products, such as capsules or tablets.

This invention focuses more particularly on turnaround devices for a transfer line that are designed based on conveyor belts. Said turnaround devices are designed to turn around a product, in particular a pharmaceutical product, by a specified angle of rotation, generally 180 degrees, from a first position to a second position so as to allow one or more operations to be carried out on the two faces or portions of the periphery of the object.

The turnaround of a product on a production line can be combined with various operations: from a simple marking on two opposite faces or portions of the product up to a precise surface check that is carried out by means of automated visual monitoring.

Thus, for various controls or operations, manufacturers are looking for turnaround devices ensuring that they operate in a precise and reliable manner without causing a reduction in the pace of large-scale production.

The problem of product turnaround arises in many industries: pharmaceuticals, automotive, plastics, metallurgy, but it is particularly in these that the turnaround of a product should be carried out in an extremely precise and quick manner.

In the pharmaceutical industry, for example, automated transfer means, such as a conveyor belt, and visual monitoring means are used in combination with turnaround means to be able to monitor the entire outside periphery of all the products, such as tablets or capsules, of a production lot before packaging and marketing.

The pace of production and the very exacting quality criteria of the pharmaceutical sector ensure that the turnaround devices that are designed for this industry may not have any design flaws that can cause down times on the production line or, more generally, a decrease in yield on said line.

Figure 1:
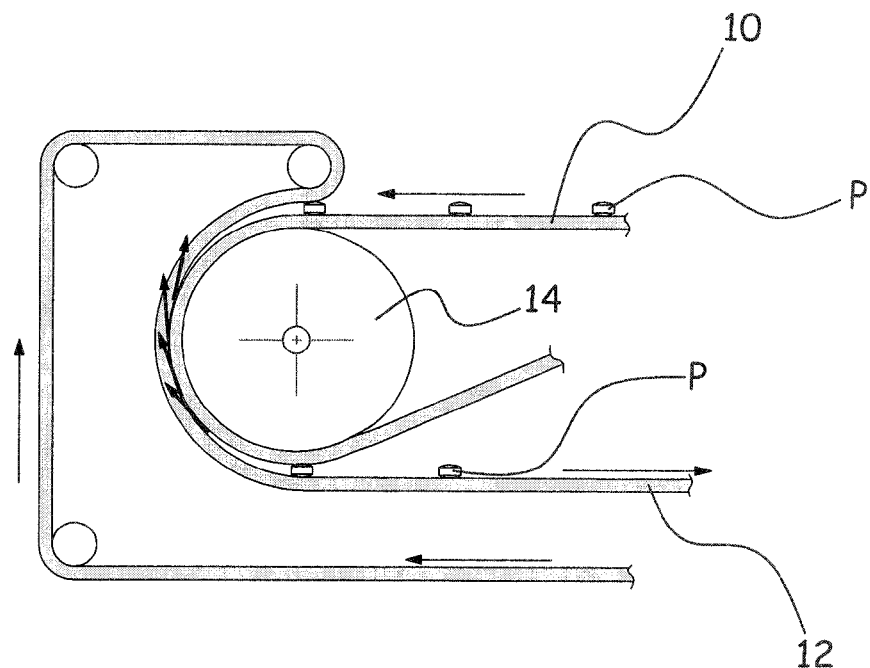

A device of the prior art, such as the one that is illustrated in FIG. 1, makes it possible to ensure quickly the transfer and the turnaround of small products P, such as capsules or tablets, and can be integrated easily into a production line of pharmaceutical products comprising conveyor belt means.

According to the design of this first device of the prior art, the products P that are to be turned around are first clamped between an input belt 10 and an output belt 12. Then, the superposition of the input belt 10, of the product or products P, and the output belt 12 is reversed by rotation around a wheel 14. The products P are therefore turned around on the output belt 12, which can be used as a means for conveying said products P that are turned around toward another station on the production line.

This first design of the prior art, however, is affected by several drawbacks.

To take into consideration the thickness of the products P that are to be turned around, the speed of the output belt 12 is to be higher than the speed of the input belt 10.

However, as illustrated in FIG. 1, when the products P do not arrive at a steady rate, in particular when a manufacturing lot is started or stopped, the output belt 12 is again in contact with the input belt 10, which causes friction between the output belt 12 and the input belt 10 and therefore ill-timed speed variations of said belts.

The speed variations of the output belts 12 and input belts 10, comparable to jerks, thus can be reproduced each time that products P no longer separate the two belts.

Said jerks are able to disrupt the even spacing of the products P and even cause said products P of said belts to drop. Primarily, however, these jerks are able to interfere with carrying out operations, such as the marking or the surface check carried out by means of automated visual monitoring, of products P when they travel on the input belts 10 and output belts 12.

More particularly, it is possible to cite the illustrative case in which a surface check of said products P, traveling on the input belts 10 and the output belts 12, is carried out before and after turnaround so as to inspect two faces of said products. The automated visual monitoring means are generally connected to ejection means that make it possible to reject the products that exhibit defects. In the case of jerks of said input belts 10 and output belts 12, the speeds and therefore the travel time of each product P between the automated visual monitoring means and the ejection means are not constant. Given the high speeds that can be reached by said belts, a slight offset induced by a jerk can produce a non-rejection of the defective product P or a rejection of another non-defective product P, whereby the parameters of the ejection means are defined based on the speed of the input belts 10 and the output belts 12.

So as to eliminate these problems, a second device of the prior art proposes the use of pins 16 to prevent the output belts 12 and the input belts 10 from coming into contact with one another.

Figure 2:
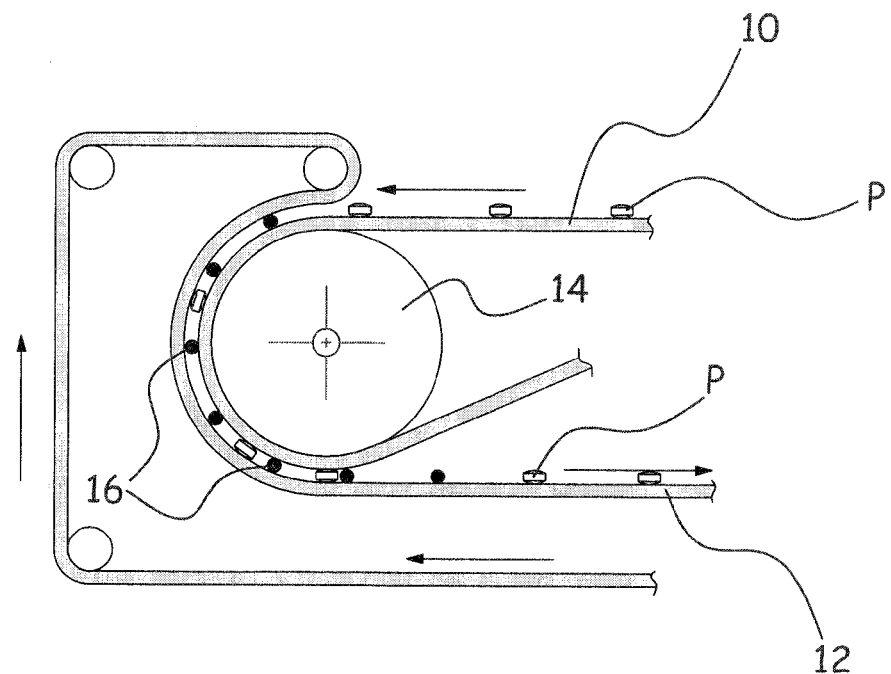

As illustrated in FIG. 2, this second solution of the prior art calls for using static spacing pins 16 in contact with the edges of the output belt 12, whereby said pins 16 make it possible to keep said output belt 12 separated from the input belt 10 during their turnaround by rotation around the wheel 14.

The static pins 16, however, inevitably cause wear on the output belt 12 because of significant friction. Even when reducing their number to a minimum, the wear caused by the static spacing pins 16 remains significant and makes it necessary to replace the output belt 12 regularly. An alternative to this second solution of the prior art may consist in mounting the pins 16 to rotate freely around their support pin. However, this design cannot be adopted because, given the speeds reached by the output belt 12, the pins 16 would reach very high rotation speeds requiring mechanically very precise and resistant connections, which would be too expensive and difficult to maintain.

Also, this invention aims at remedying the drawbacks of the prior art by proposing a turnaround device with belts of products P, in particular pharmaceutical products P, which can make it possible to achieve the large-scale turnaround of products P in a quick and reliable way for an application to production lines of very exacting industries, such as the pharmaceutical industry. The turnaround device according to the invention makes it possible to ensure stabilized belt speeds during a production cycle and therefore even spacing between the products P that are necessary to the good sequence of operations conducted by other devices on the products P that travel on said belts of said turnaround device.

For this purpose, the invention has as its object a turnaround device for a transfer line of products P, in particular pharmaceutical products, comprising at least one turnaround wheel that uses a guide surface Sint, whereby said wheel is mounted so as to rotate around a so-called turnaround axis and at least two belts clamp the products P that are to be turned around, at least one input belt guided by the surface Sint and moving at a speed Vint and at least one output belt moving at a speed Vext, whereby Vint is different from Vext, characterized in that said turnaround device uses guide means that comprise at least one guide surface Sext at the speed Vext of the output belt.

The means for guiding the device according to the invention allow the separation of the output belt and the input belt with a minimum amount of friction when there are no products P to keep them separated, thus avoiding any variation of speed or jerk of said belts.

The turnaround device according to the invention can also be easily integrated into a station on a production line.

Figure 6:
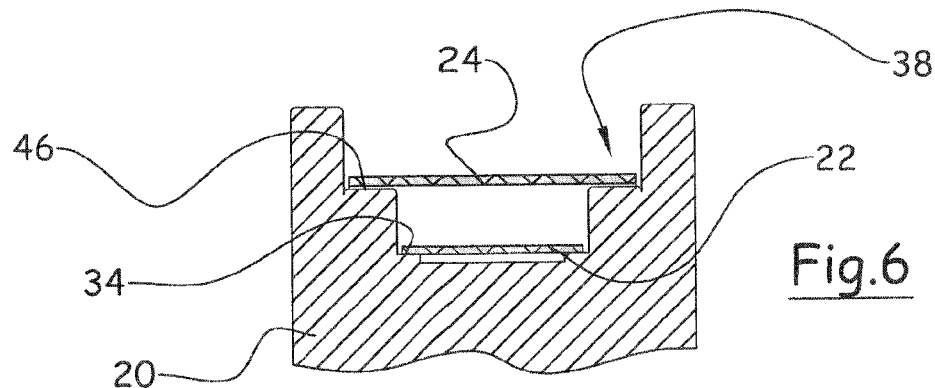
Figure 5:
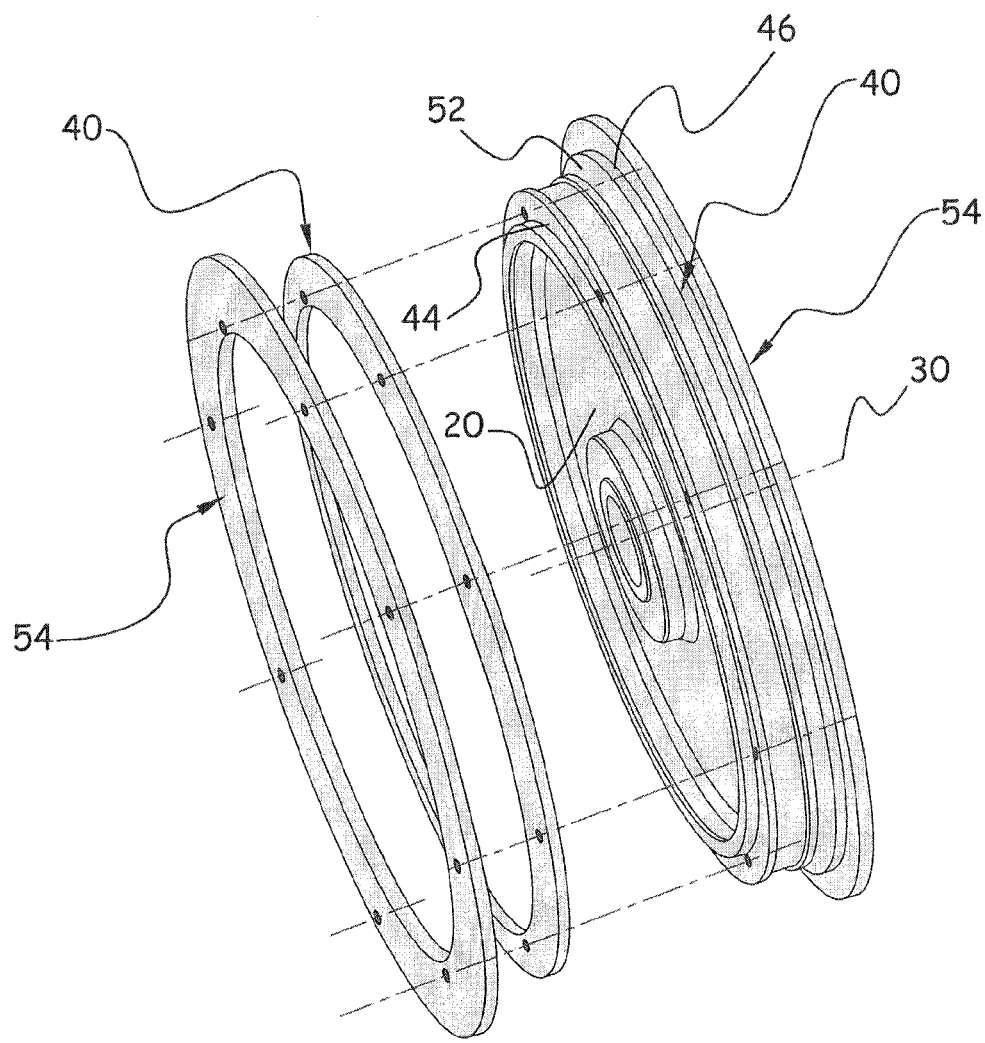
Figure 7:
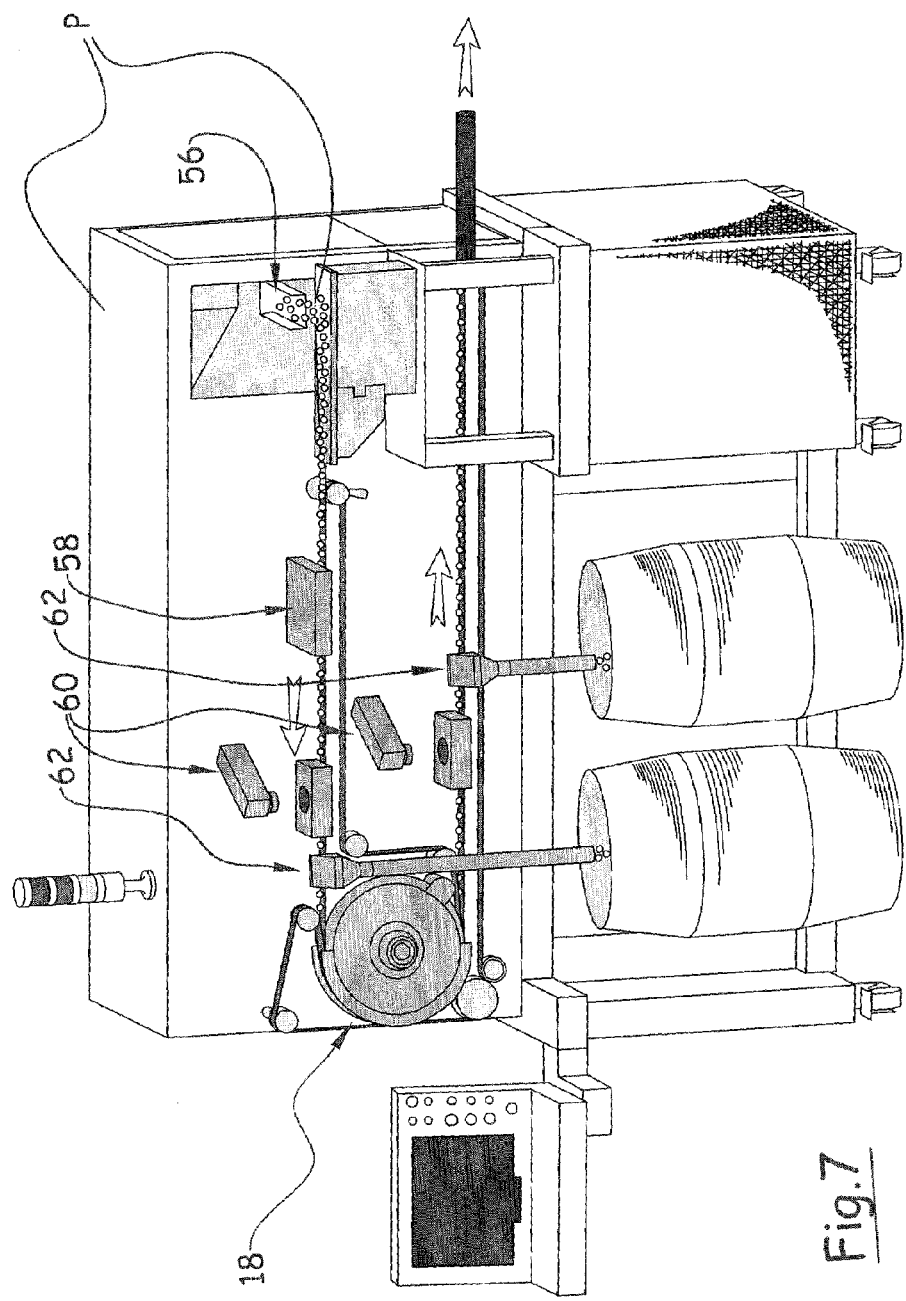

Other characteristics and advantages will emerge from the following description of the invention, a description that is provided only by way of example, taking into account the accompanying drawings, in which:

FIG. 1 is a diagram that illustrates a first turnaround device of the prior art, FIG. 2 is a diagram that illustrates a second turnaround device according to the prior art, FIG. 3 is a diagram that shows a turnaround device according to the invention, FIG. 4 is a cutaway view of a turnaround device according to the invention, FIG. 5 is an exploded view illustrating the assembly of two wheel rims and two flanges on a turnaround wheel, FIG. 6 is a figure that illustrates a variant embodiment of a turnaround device according to the invention, FIG. 7 is a view of a station on a production line that uses a turnaround device according to the invention.

This invention relates to a turnaround device 18 that is particularly suitable for being integrated in a transfer line of products P, in particular pharmaceutical products such as tablets or capsules. The pharmaceutical industry is one of the most exacting in terms of production pace and reliability of the various devices that constitute its production lines; the turnaround device 18 according to the invention therefore proposes meeting these requirements by a design that is simple but whose kinematics are optimized to impart to said device 18 a reliable and stable operation over numerous production cycles.

For this purpose, as illustrated in FIG. 3, a turnaround device 18 according to the invention comprises at least one turnaround wheel 20 and at least two belts 22, 24 that clamp the products P that are to be turned around, at least one input belt 22 and at least one output belt 24 that move respectively at a speed Vint and Vext, whereby Vint is different from Vext, under the effect of suitable drive means.

To provide a connection, a turnaround device 18 according to the invention is able to work at a pace that is higher than thirty products P per second while avoiding the speed variations of the input belts 22 and output belts 24 noted with the devices of the prior art.

The input belts 22 and output belts 24 of a turnaround device 18 according to the invention are continuous belts. For this purpose, return rollers 26 make it possible to create closed circuits, at least one circuit for the input belt and at least one circuit for the output belt, on which said input and output belts can travel continuously.

Means 28 for tightening said belts, generally used by one skilled in the art on the conveyor belt devices, can be provided so as to ensure an adjustable tightening for each of said belts.

The products P, in particular pharmaceutical products, are placed on said input belt by first conveying means located upstream from the turnaround device 18 according to the invention.

Advantageously, said input belt 22 can be used as the first conveying means of a station on the production line that integrates a turnaround device 18 according to the invention, in which case the products P are distributed on said input belt and spaced at approximately regular intervals by distribution means and spacing means that are known to one skilled in the art.

The input belt 22 moves at a speed Vint that depends on the pace of the first conveying means or the feed rate of products P that are provided upstream from the turnaround device 18.

The turnaround of the products P, in particular pharmaceutical products, is obtained by rotating said products P that are clamped between the input belts 22 and the output belts 24 around a so-called turnaround axis 30 that is approximately perpendicular to the direction of travel A, illustrated by arrows in FIG. 3, of said belts.

So as to be turned around by rotation around the turnaround axis 30, the input belt 22 is guided at its speed Vint by at least one guide surface Sint of the turnaround wheel 20.

The surface Sint can be a continuous or intermittent surface, i.e., providing a continuous or intermittent guiding of the input belt during its turnaround by rotation around the turnaround axis 30.

According to the preferred embodiment of the invention, the guide surface Sint comprises a central release 32 such that the input belt rests only on two outside and cylindrical bearings 34 located approximately on both sides of the outside cylindrical surface of the turnaround wheel 20.

According to the preferred embodiment of the invention, this guide surface Sint is part of the turnaround wheel 20 and is found to be the outside cylindrical surface of said wheel. The width of the guide surface Sint of the input belt 22 is therefore based essentially on the width of the turnaround wheel 20.

Still according to a preferred embodiment of the invention, the input belt is driven at its speed Vint by the guide surface Sint of the turnaround wheel 20. The surface Sint, which is therefore used as a driving surface, is made of a material and/or forms able to ensure adequate attachment to the input belt 22 to transmit the drive torque transmitted by drive means, in particular motorized and controlled drive means, to the turnaround wheel 20. Optionally, a coating, in particular an elastomer, can be applied to the guide surface Sint to improve the attachment to the input belt 22.

So as to maintain the products P, in particular pharmaceutical products, during their turnaround by rotation and to ensure their recovery to subsequently evacuate them toward the second conveying means of a station on a production line that integrates a turnaround device 18 according to the invention, or, directly toward evacuation means located downstream from the turnaround device according to the invention, said turnaround device 18 comprises at least one output belt 24 that moves at a speed Vext and that clamps the products P that are to be turned around with the input belt 22.

The speed Vext of the output belt 24 is different from the speed Vint of the input belt 22 given the spacing E that is necessary for clamping the products P between said belts during the turnaround by rotation.

Thus, the speed Vext of the output belt 24 is essentially defined by the thickness of the products P, the radius R of the turnaround wheel 20, the speed Vint of the input belt, as well as by the flexibility of said input and output belts.

To obtain optimum driving of the output belt 24 that makes it possible to avoid the speed variations and jerks noted with the turnaround devices of the prior art, it is necessary to keep said output belt 24 separated from the input belt and, preferably, by guiding said output belt 24 at the speed Vext that is determined by the parameters indicated above.

To guide the output belt 24 in an optimum manner, i.e., without sliding, at the speed Vext during its turnaround by rotation around the turnaround axis 30, the turnaround device 18 according to the invention uses guide means 38 that comprise at least one guide surface Sext at the speed Vext of the output belt 24.

The surface Sext can be a continuous or intermittent surface, i.e., providing a continuous or intermittent guiding of the output belt during its turnaround by rotation around the turnaround axis.

Thus, the surface Sext can be intermittent by being produced from several angular sectors that are distant from one another and that form in a discrete manner an essentially cylindrical surface that corresponds to said surface Sext. Advantageously, by acting on the position of said annular sectors relative to the turnaround axis 30, it becomes possible to vary the diameter of the surface Sext to adapt to the different formats of turnaround products P that are to be turned around.

So as to guide, with the minimum amount of friction possible, the output belt 24 at the speed Vext, the surface Sext also moves at the speed Vext.

To do this, the guide surface Sext is in synchronous rotation with the turnaround wheel 20 around the turnaround axis 30 and is found at a distance that is essentially defined by the thickness of the products P, the radius R of the turnaround wheel 20, the speed Vint of the input belt 22 as well as by the flexibility of said input belts 22 and output belts 24.

According to a preferred embodiment of the invention, the spacing E between the input belts 22 and the output belts 24, or the spacing between the interior guide surfaces Sint and exterior guide surfaces Sext, provided by the guide means 38, is essentially smaller than the thickness of the products P that are to be turned around. Actually, so as to better hold the products P by clamping and to prevent them from being damaged during said turnaround, said input belts 22 and output belts 24 are preferably made of a flexible material, in particular woven and coated with an elastomer, able to deform slightly, as illustrated in FIG. 4.

There, at least one guide surface Sext of the guide means 38 can be carried by the turnaround wheel 20.

More specifically, said at least one guide surface Sext is produced by at least one wheel rim 40 that is added by suitable attachment means 42, such as screws, onto the turnaround wheel 20. More particularly, the wheel rim is added onto said wheel 20 at a shoulder 44, illustrated in FIG. 5, making possible a precise positioning by centering.

A wheel rim 40 has an annular shape, with a height H that is suitable for products P that are to be turned around and with a thickness J that is adequate for guiding the output belt, whereby the outside cylindrical portion of said wheel rim 40 forms a cylindrical bearing 46 that is used to provide the surface Sext for guiding the output belt.

The adjustment of the diameter of the cylindrical bearing 46, or of the height 11 of a wheel rim 40, makes it possible to vary the spacing E easily between the input and output belts: it is necessary to have a set of wheel rims that is suitable for different thicknesses of the products P that are to be turned around, whereby the attachment means 42 allow quick assembly and disassembly of a wheel rim 40.

According to a preferred embodiment of a turnaround device 18 according to the invention, in particular illustrated in FIGS. 4 and 5, the guide surface Sext is produced by at least two wheel rims 40 that are added onto both sides of the turnaround wheel 20 and that free up a passage 48 toward the guide surface Sint with a width that is approximately equal to the width of the input belt. Thus, at least two bearings 46 that make possible the guiding of the output belt 24 are created on both sides of the surface Sint of the turnaround wheel 20, or on both sides of the input belt 22. Thus, in the same way that the central release 32 of the guide surface Sint allows it with regard to the input belt 22, the passage 48 that is freed up allows the output belt 24 to deform slightly so as to better hold the products P without damaging them.

Advantageously, the turnaround device 18 according to the invention comprises anti-escape means 50 of the input and output belts, whereby said anti-escape means 50 prevent said input and output belts from leaving their guide surfaces, respectively Sint and Sext.

Still according to a preferred embodiment of the invention, the anti-escape means 50 of the input belt 22 are provided by the inside wall 52 of the wheel rims 40 that are located on both sides of the input belt 22, and the anti-escape means 50 of the output belt 24 are provided by means of the flanges 54, one flange 54 added onto each of the wheel rims 40.

According to a preferred embodiment of the invention, the output belt 24 is only guided at its speed Vext by the guide surface Sext, whereby the driving of said output belt 24 is carried out by another element for production of the closed circuit of said belt, such as, for example, a pressure roller.

According to another embodiment of the invention, the Sext surface drives the output belt 24 at its speed Vext. The surface Sext, which is used as a driving surface, can therefore be made of a material and/or forms able to ensure adequate attachment to the output belt 24 to transmit the driving torque that is transmitted by drive means, in particular motorized and controlled, to the turnaround wheel 20. Optionally, a coating, in particular an elastomer, can be applied to the guide surface Sext to improve the attachment to the output belt 24. According to a preferred embodiment of the invention, the output belt 24 is necessarily wider than the input belt 22.

It is obvious that the invention also covers the variant embodiment of a turnaround device 18, illustrated in FIG. 6, whose turnaround wheel 20, the wheel rim(s) 40, and the flange(s) 54 form only a single element, in particular obtained by mass machining or obtained from molding. In this variant, the cylindrical bearings 46 are part of the wheel 20.

As FIG. 7 illustrates, a turnaround device according to the invention can be easily integrated with a station on a production line and makes it possible to limit the space requirement of said station by promoting the compactness of its arrangement.

The station shown in FIG. 7 is a station for monitoring the quality of the products P before packaging and marketing.

This station comprises distribution means 56 and spacing means 58 at regular intervals of products P on the input belt 22 that is used as first conveying means of said monitoring station.

First visual monitoring means 60 inspect a first face or portion of products P and are combined with first evacuation means 62 so as to evacuate the products P that have defects. Then, after turnaround of said products P using a turnaround device 18 according to the invention, the products P that are turned around are conveyed by the output belt 24 of said turnaround device toward second visual monitoring means 60 that are combined with second evacuation means 62.

Used as second conveying means of the production station, the output belt 24 can be used to bring the monitored products P to storage means or another station on the production line.

The application of a turnaround device 18 that is described above is only one example that is intended to illustrate the capacities for integration of the device according to the invention in a station on a production line; any other application of a turnaround device 18 is, of course, covered by the invention.

The invention claimed is:

1. Turnaround device (18) for a transfer line of products P, in particular pharmaceutical products, comprising at least one turnaround wheel (20) that uses a guide surface Sint, whereby said wheel (20) is mounted so as to rotate around a so-called turnaround axis (30) and at least two belts clamp the products P that are to be turned around, at least one input belt (22) guided by the surface Sint and moving at a speed Vint, and at least one output belt (24) moving at a speed Vext, whereby Vint is different from Vext, characterized in that said turnaround device uses guide means (38) that comprise at least one guide surface Sext at the speed Vext of the output belt (24).

2. Turnaround device (18) for a transfer line of products P, in particular pharmaceutical products, according to claim 1, wherein the at least one guide surface Sint of the turnaround wheel (20) and the at least one guide surface Sext of the guide means (38) can be continuous or intermittent surfaces.

3. Turnaround device (18) for a transfer line of products P, in particular pharmaceutical products, according to claim 1, wherein the at least one guide surface Sext of the guide means (38) is in synchronous rotation with the turnaround wheel (20) around the turnaround axis (30).

4. Turnaround device (18) for a transfer line of products P, in particular pharmaceutical products, according to claim 1, wherein the at least one guide surface Sext of the guide means (38) is carried by the turnaround wheel (20).

5. Turnaround device (18) for a transfer line of products P, in particular pharmaceutical products, according to claim 4, wherein the at least one guide surface Sext is produced by at least one wheel rim (40) that is added onto the turnaround wheel (20).

6. Turnaround device (18) for a transfer line of products P, in particular pharmaceutical products, according to claim 5, wherein the wheel rim (40) has a height H that is suitable for products P that are to be turned around and a thickness J that is adequate for guiding the output belt (24).

7. Turnaround device (18) for a transfer line of products P, in particular pharmaceutical products, according to claim 5, wherein the at least one guide surface Sext is produced by at least two wheel rims (40), added onto both sides of the surface Sint of the turnaround wheel (20), creating at least two cylindrical bearings (46) for guiding the output belt (24).

8. Turnaround device (18) for a transfer line of products P, in particular pharmaceutical products, according to claim 7, wherein it comprises anti-escape means (50) of the input belts (22) and output belts (24), the anti-escape means (50) of the input belt (22) are provided by the inside wall (52) of the wheel rims (40) that are located on both sides of the surface Sint, and the anti-escape means (50) of the output belt (24) are provided by means of the flanges (54), one flange (54) added onto each of the wheel rims (40).

9. Turnaround device (18) for a transfer line of products P, in particular pharmaceutical products, according to claim 1, wherein the guide surfaces Sint and Sext are used as driving surfaces, respectively, of the input belts (22) and output belts (24).

10. Turnaround device (18) for a transfer line of products P, in particular pharmaceutical products, according to claim 7, wherein the guide surface Sint comprises a central release (32) and wherein the two wheel rims (40) that are located on both sides of the surface Sint free up a passage (48) that allows respectively the input belts (22) and the output belts (24) to deform slightly so as to better hold the products P without damaging them.

11. Station on a production line that comprises a transfer line of products P, in particular pharmaceutical products, integrating a turnaround device (18) according to claim 1.

12. Turnaround device (18) for a transfer line of products P, in particular pharmaceutical products, according to claim 2, wherein the at least one guide surface Sext of the guide means (38) is in synchronous rotation with the turnaround wheel (20) around the turnaround axis (30).

13. Turnaround device (18) for a transfer line of products P, in particular pharmaceutical products, according to claim 2, wherein the at least one guide surface Sext of the guide means (38) is carried by the turnaround wheel (20).

14. Turnaround device (18) for a transfer line of products P, in particular pharmaceutical products, according to claim 3, wherein the at least one guide surface Sext of the guide means (38) is carried by the turnaround wheel (20).

15. Turnaround device (18) for a transfer line of products P, in particular pharmaceutical products, according to claim 6, wherein the at least one guide surface Sext is produced by at least two wheel rims (40), added onto both sides of the surface Sint of the turnaround wheel (20) creating at least two cylindrical bearings (46) for guiding the output belt (24).

16. Turnaround device (18) for a transfer line of products P, in particular pharmaceutical products, according to claim 2, wherein the guide surfaces Sint and Sext are used as driving surfaces, respectively, of the input belts (22) and output belts (24).

17. Turnaround device (18) for a transfer line of products P, in particular pharmaceutical products, according to claim 8, wherein the guide surface Sint comprises a central release (32) and wherein the two wheel rims (40) that are located on both sides of the surface Sint free up a passage (48) that allows respectively the input belts (22) and the output belts (24) to deform slightly so as to better bold the products P without damaging them.

18. Turnaround device (18) for a transfer line of products P, in particular pharmaceutical products, according to claim 9, wherein the guide surface Sint comprises a central release (32) and wherein the two wheel rims (40) that are located on both sides of the surface Sint free up a passage (48) that allows respectively the input belts (22) and the output belts (24) to deform slightly so as to better hold the products P without damaging them.

* * * * *